United States Patent
Ko et al.

(10) Patent No.: US 9,494,129 B2
(45) Date of Patent: Nov. 15, 2016

(54) MULTIPLE OSCILLATION-TYPE GENERATOR

(71) Applicant: KOREA INSTITUTE OF OCEAN SCIENCE & TECHNOLOGY, Ansan-si (KR)

(72) Inventors: Jin Hwan Ko, Seoul (KR); Kwang-Soo Lee, Seoul (KR); Patar Ebenezer Sitorus, Ansan-si (KR)

(73) Assignee: KOREA INSTITUTE OF OCEAN SCIENCE & TECHNOLOGY (KR)

( * ) Notice: Subject to any disclaimer, the term of this patent is extended or adjusted under 35 U.S.C. 154(b) by 61 days.

(21) Appl. No.: 14/499,587

(22) Filed: Sep. 29, 2014

(65) Prior Publication Data

US 2015/0091305 A1    Apr. 2, 2015

(30) Foreign Application Priority Data

Sep. 30, 2013 (KR) .................. 10-2013-0116657

(51) Int. Cl.
F03B 13/26    (2006.01)

(52) U.S. Cl.
CPC ...... *F03B 13/264* (2013.01); *F05B 2260/4021* (2013.01); *F05B 2260/4031* (2013.01); *Y02E 10/28* (2013.01); *Y02E 10/38* (2013.01)

(58) Field of Classification Search
CPC ........................................ F03G 3/06
USPC ................. 290/54, 43, 1 R; 416/79
See application file for complete search history.

(56) References Cited

U.S. PATENT DOCUMENTS

| | | | | | |
|---|---|---|---|---|---|
| 396,557 | A * | 1/1889 | Flatz | ............... | H02K 7/116 290/1 E |
| 3,040,976 | A * | 6/1962 | De Mattos | ........... | F24F 7/013 416/66 |
| 3,861,487 | A * | 1/1975 | Gill | ............... | B60K 25/10 180/165 |
| 3,995,972 | A * | 12/1976 | Nassar | ............ | F03D 5/06 415/2.1 |
| 4,170,738 | A * | 10/1979 | Smith | ............. | F03B 13/185 185/30 |
| 4,184,805 | A * | 1/1980 | Arnold | ............. | F03D 5/06 416/1 |
| 4,255,085 | A * | 3/1981 | Evans | ............. | F03D 3/061 416/178 |
| 4,408,954 | A * | 10/1983 | Earle | ............. | F03D 7/0212 416/132 B |
| 4,450,362 | A * | 5/1984 | Gallagher | ........ | F03D 9/026 185/7 |
| 4,852,350 | A * | 8/1989 | Krisko | ............ | F03G 3/06 60/325 |

(Continued)

FOREIGN PATENT DOCUMENTS

| | | |
|---|---|---|
| JP | 09184471 | 7/1997 |
| JP | 9184471 | * 7/1997 |
| KR | 101049217 | 7/2011 |

*Primary Examiner* — Tulsidas C Patel
*Assistant Examiner* — Charles Reid, Jr.
(74) *Attorney, Agent, or Firm* — Cantor Colburn LLP

(57) ABSTRACT

A multiple oscillation-type generator includes: a first reciprocating member arranged inside a fluid and configured to reciprocate by lifting force, lowering force, or flow energy resulting from the fluid; a second reciprocating member arranged inside the fluid at a distance from the first reciprocating member and configured to reciprocate by lifting force, lowering force, or flow energy resulting from the fluid; a first conversion unit connected to the first reciprocating member and configured to convert reciprocating movements into rotational movements; a second conversion unit connected to the second reciprocating member and configured to convert reciprocating movements into rotational movements; a main power shaft configured to make rotational movements by rotational movements of the first conversion unit and the second conversion unit; and a generation unit configured to produce electric power using transferred rotational movements of the main power shaft.

11 Claims, 9 Drawing Sheets

(56) References Cited

U.S. PATENT DOCUMENTS

| | | | |
|---|---|---|---|
| 5,889,336 A * | 3/1999 | Tateishi | F03B 13/1865 290/43 |
| 6,273,680 B1 * | 8/2001 | Arnold | F03B 17/00 416/1 |
| 6,555,931 B2 * | 4/2003 | Mizzi | F03B 17/00 244/153 R |
| 6,856,042 B1 * | 2/2005 | Kubota | F03D 1/025 290/43 |
| 6,877,692 B2 * | 4/2005 | Liu | F42B 10/64 244/22 |
| 7,151,322 B2 * | 12/2006 | Eskandr | F03G 1/00 290/1 R |
| 7,963,112 B1 * | 6/2011 | Joseph | F03B 13/144 290/42 |
| 8,330,282 B2 * | 12/2012 | Niioka | F03G 7/10 290/1 C |
| 8,469,663 B2 | 6/2013 | Kerr | |
| 2005/0160845 A1 * | 7/2005 | Keefe | F03G 3/08 74/84 S |
| 2005/0248159 A1 * | 11/2005 | Seoane | F03G 6/06 290/1 R |
| 2013/0202407 A1 | 8/2013 | Dumas et al. | |
| 2013/0216381 A1 | 8/2013 | Liu | |

\* cited by examiner

MULTIPLE OSCILLATION-TYPE GENERATOR

BACKGROUND OF THE INVENTION

1. Field of the Invention

The present invention relates to a multiple oscillation-type generator, and more particularly to a multiple oscillation-type generator configured to generate electric power by repeatedly ascending and descending inside a flowing fluid by means of flow energy of the fluid.

2. Description of the Prior Art

Tidal stream generation refers to a type of generation using the flow of seawater and, unlike tidal power generation which installs a breakwater near a shore and generates electric power using the difference of ebb and flow tides, utilizes fast sea currents and rotates turbines installed in the sea, without installing a dam or a breakwater in the corresponding area.

Since there is no need to build a breakwater, the tidal stream generation costs less than the tidal power generation, allows free passage of ships, and has neither interference with movements of fishes nor influence on surrounding ecosystems, making it eco-friendly.

In this regard, US Patent Publication No. 2013-0202407 entitled "OSCILLATING HYDROFOIL, TURBINE, PROPULSIVE SYSTEM AND METHOD FOR TRANSMITTING ENERGY" discloses a power transmission device including a vertical post and first and second hydrofoils which extend from the post in the horizontal direction and which are configured to be rotated by flow of a fluid and moved along the longitudinal direction of the post.

The power transmission device disclosed in US Patent Publication No. 2013-0202407, more specifically, includes a first hydraulic cylinder provided inside the post and configured to operate as the first hydrofoil reciprocates and a second hydraulic cylinder provided inside the post and configured to operate as the second hydrofoil reciprocates, as in the case of the first hydraulic cylinder. As the first and second hydrofoils reciprocate linearly, the first and second hydraulic cylinders convert kinetic energy, which results from a movement of the internal fluid, into mechanical work and produce electric power.

In addition, Registered U.S. Pat. No. 8,469,663 and US Patent Publication No. 2013-0216381 disclose technology for driving a turbine using the linear reciprocating movement of a foil resulting from flow energy of a fluid, as well as a generator configured to drive a turbine using the rotational reciprocating movement of a foil.

Conventional power transmission devices disclosed in US Patent Publication No. 2013-0202407, Registered U.S. Pat. No. 8,469,663, and US Patent Publication No. 2013-0216381 change the angle between the foil and the direction in which the fluid flows, and thereby generate lift, which results from flow energy of the fluid, in the direction of reciprocating movement of the foil.

In the case of such a power transmission device having a foil configured to reciprocate using flow energy of the fluid, the generation efficiency of the turbine improves in proportion to the magnitude of lift generated by the foil, making the foil shape design critical.

However, conventional power transmission devices disclosed in US Patent Publication No. 2013-0202407, Registered U.S. Pat. No. 8,469,663, and US Patent Publication No. 2013-0216381 have a problem in that the fixed foil shape prevents the magnitude of lift, which acts on both surfaces of the foil, from increasing beyond a predetermined range, placing a limit to increasing the magnitude of lift by using the foil shape as a parameter.

There is also a problem in that, when additional power is used to variably change the foil shape, in order to generate larger lift acting on the foil, the generation efficiency of the turbine decreases in proportion to the amount of additionally used power.

SUMMARY OF THE INVENTION

The present invention has been made in order to solve the above-mentioned problems in the prior art and an aspect of the present invention is to provide a multiple oscillation-type generator which prevents energy loss caused by frictional heat resulting from use of a hydraulic device, which minimizes energy loss resulting from friction with the fluid flow and vibration resulting from the same, and which is configured to continuously transfer kinetic energy.

In order to accomplish these objects, there is provided a multiple oscillation-type generator configured to convert flow energy of a fluid and produce electric power, the multiple oscillation-type generator including: a first reciprocating member arranged inside a fluid and configured to reciprocate by means of lifting force, lowering force, or flow energy resulting from the fluid; a second reciprocating member arranged inside the fluid at a distance from the first reciprocating member and configured to reciprocate by means of lifting force, lowering force, or flow energy resulting from the fluid; a first conversion unit connected to the first reciprocating member and configured to convert reciprocating movements into rotational movements; a second conversion unit connected to the second reciprocating member and configured to convert reciprocating movements into rotational movements; a main power shaft configured to make rotational movements by means of rotational movements of the first conversion unit and the second conversion unit; and a generation unit configured to produce electric power using transferred rotational movements of the main power shaft, wherein rotational movements of the main power shaft are not transferred to the first conversion unit and the second conversion unit.

The multiple oscillation-type generator may further include a first one-way clutch configured to connect the first conversion unit and the main power shaft; and a second one-way clutch configured to connect the second conversion unit and the main power shaft.

The first one-way clutch and the second one-way clutch may be formed on the main power shaft.

The multiple oscillation-type generator may further include a first gear coupled to the second one-way clutch; a second gear configured to rotate while being interlocked with the first gear; and an auxiliary power shaft configured to rotate together with the second conversion unit and the second gear.

The multiple oscillation-type generator may further include a first pulley coupled to the first one-way clutch; and a first belt configured to make a connection so that the first conversion unit and the first pulley are interlocked and rotated.

The multiple oscillation-type generator may further include a second pulley coupled to the second one-way clutch; and a second belt configured to make a connection so that the second conversion unit and the second pulley are interlocked and rotated.

The multiple oscillation-type generator may further include a first crank coupled to the main power shaft and rotated together, the first crank having an eccentric center of gravity with respect to the main power shaft; and a second crank coupled to the auxiliary power shaft and rotated together, the second crank having an eccentric center of gravity with respect to the auxiliary power shaft.

A fly wheel may be coupled to the main power shaft.

Each of the first conversion unit and the second conversion unit may include a first conversion module configured to convert reciprocating movements of the first reciprocating member and the second reciprocating member into bidirectional rotational movements; and a second conversion module configured to convert the bidirectional rotational movements of the first conversion module into unidirectional rotational movements.

The second conversion module may include a first bidirectional rotation gear and a second bidirectional rotation gear configured to rotate in both directions by means of the first conversion module; a first idler gear configured to engage with the first bidirectional rotation gear and rotate together; a second idler gear configured to rotate together with the first idler gear; a first output gear coupled to an output shaft and configured to engage with the second bidirectional rotation gear and rotate together; a second output gear coupled to the output shaft and configured to engage with the second idler gear and rotate together; a third one-way clutch configured to connect the first output gear and the output shaft; and a fourth one-way clutch configured to connect the second output gear and the output shaft.

The first conversion module may include a swing member having one end coupled to the first reciprocating member and the second reciprocating member; a first rotation member coupled to the other end of the swing member and configured to make bidirectional rotations interlocked with reciprocating movements of the first reciprocating member and the second reciprocating member; a second rotation member arranged at a distance from the first rotation member and connected to the first bidirectional rotation gear and the second bidirectional rotation gear; and a rotation force transfer member configured to connect the first rotation member and the second rotation member.

The present invention can provide a multiple oscillation-type generator having swing members, which rotate together with the first reciprocating member and the second reciprocating member and transfer kinetic energy of the first reciprocating member and the second reciprocating member to the first conversion modules and the second conversion modules, and the length of which is reduced within the entire kinetic energy transfer range, thereby minimizing energy loss caused by friction with fluid flow and resulting vibration.

The present invention can also provide a multiple oscillation-type generator which can adjust the phase difference between the first reciprocating member and the second reciprocating member and which enables connection of an additional reciprocating member and a conversion unit, so that kinetic energy can be transferred continuously without forming any non-transfer point.

The present invention can also provide a multiple oscillation-type generator configured to transfer kinetic energy of the first reciprocating member and the second reciprocating member to the generation unit by means of a mechanical transfer configuration, thereby preventing energy loss caused by frictional heat resulting from use of a hydraulic device.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, exemplary embodiments of the present invention will be described in detail with reference to the accompanying drawings. In the description of the present invention, the description of the well-known function or structure will be omitted in order to clear the subject matter of the present invention.

A multiple oscillation-type generator according to the present invention prevents energy loss caused by frictional heat resulting from use of a hydraulic device, minimizes energy loss resulting from friction with the fluid flow and vibration resulting from the same, and is configured to continuously transfer kinetic energy.

Figure 1:
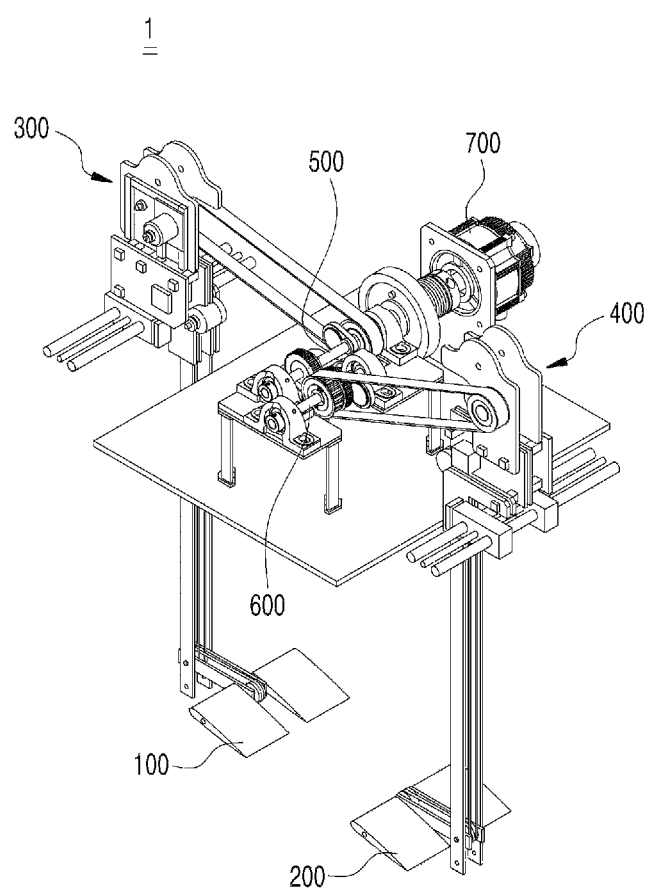
FIG. 1 is an overall perspective view of a multiple oscillation-type generator according to an embodiment of the present invention.
Figure 2:
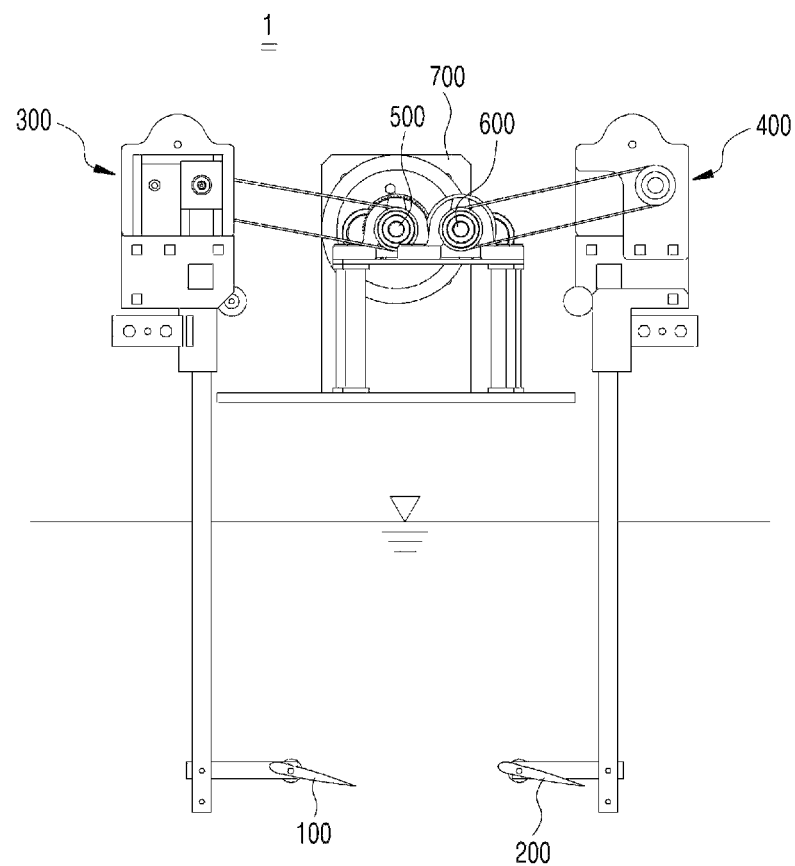
FIG. 2 is a front view illustrating the installation state of the multiple oscillation-type generator of FIG. 1.
Figure 3:
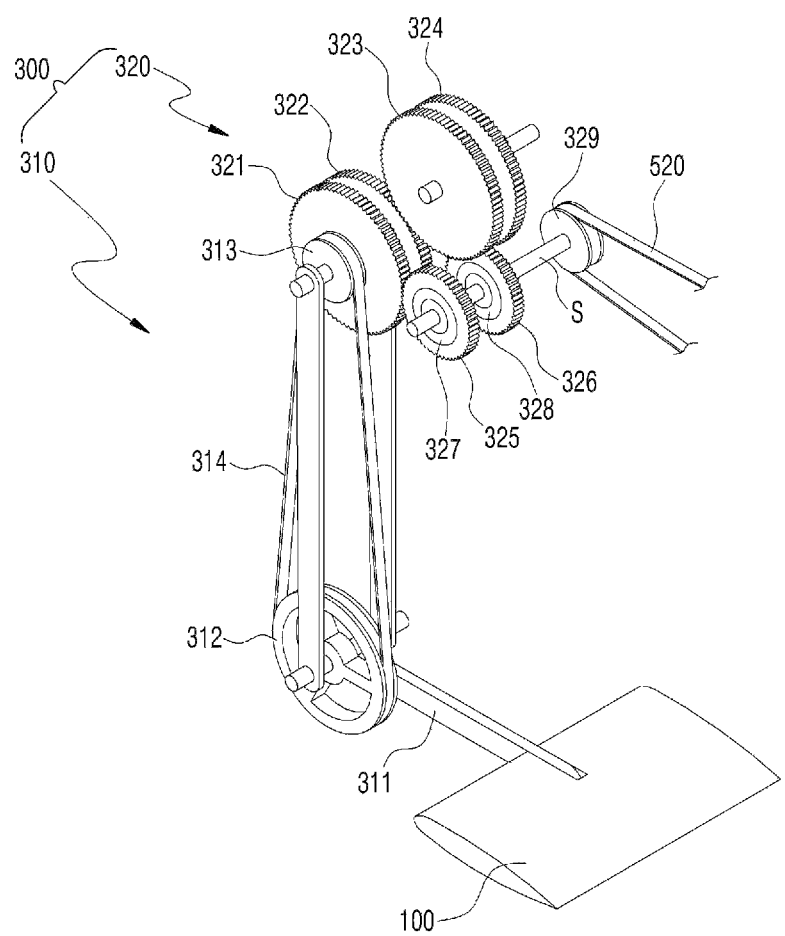
FIG. 3 is a perspective view illustrating a first reciprocating member and a first conversion unit of the multiple oscillation-type generator of FIG. 1.
Figure 4:
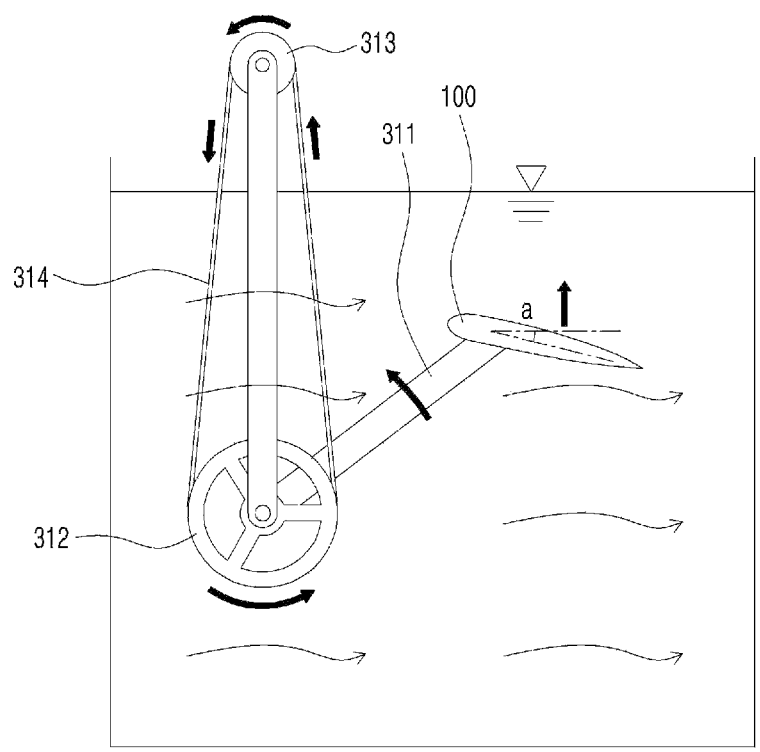
FIGS. 4 and 5 are front views illustrating the operating state of the first reciprocating member and the first conversion unit of FIG. 3.
Figure 5:
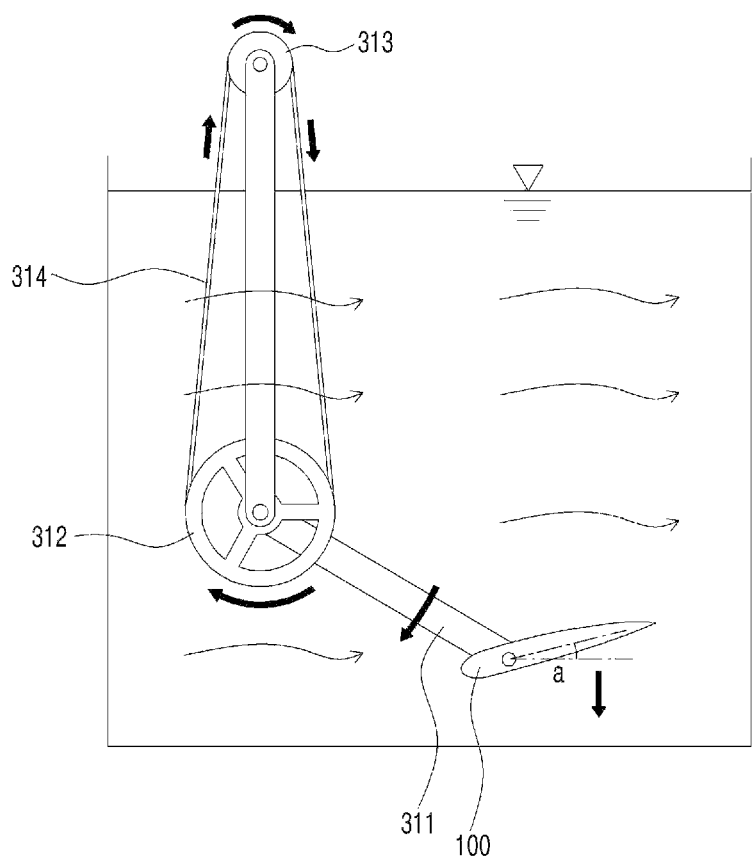
Figure 6:
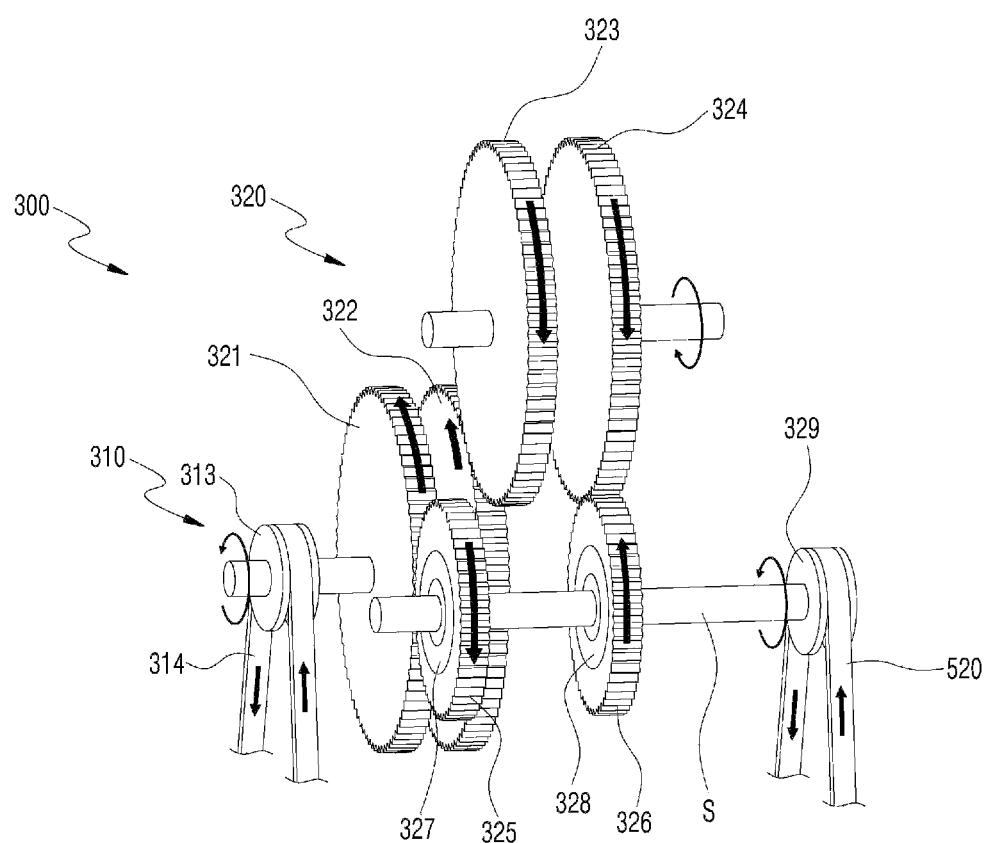
FIGS. 6 and 7 are perspective views illustrating the operating state of the first conversion unit of FIG. 3.
Figure 7:
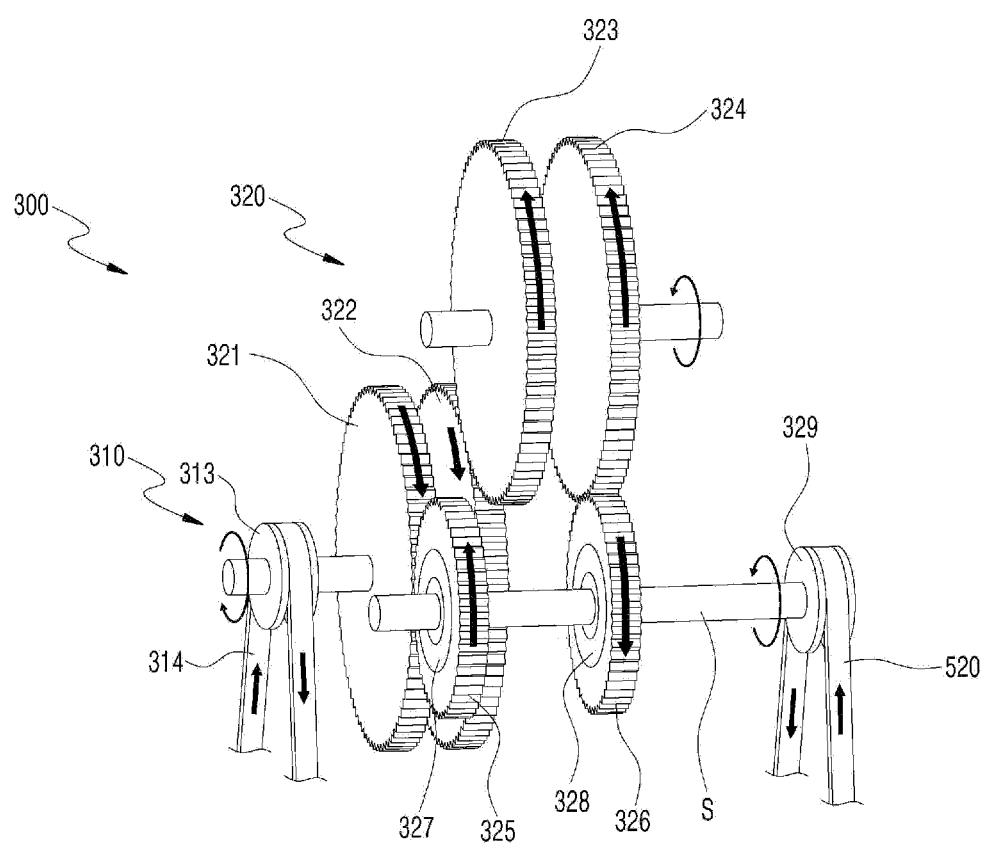
Figure 8:
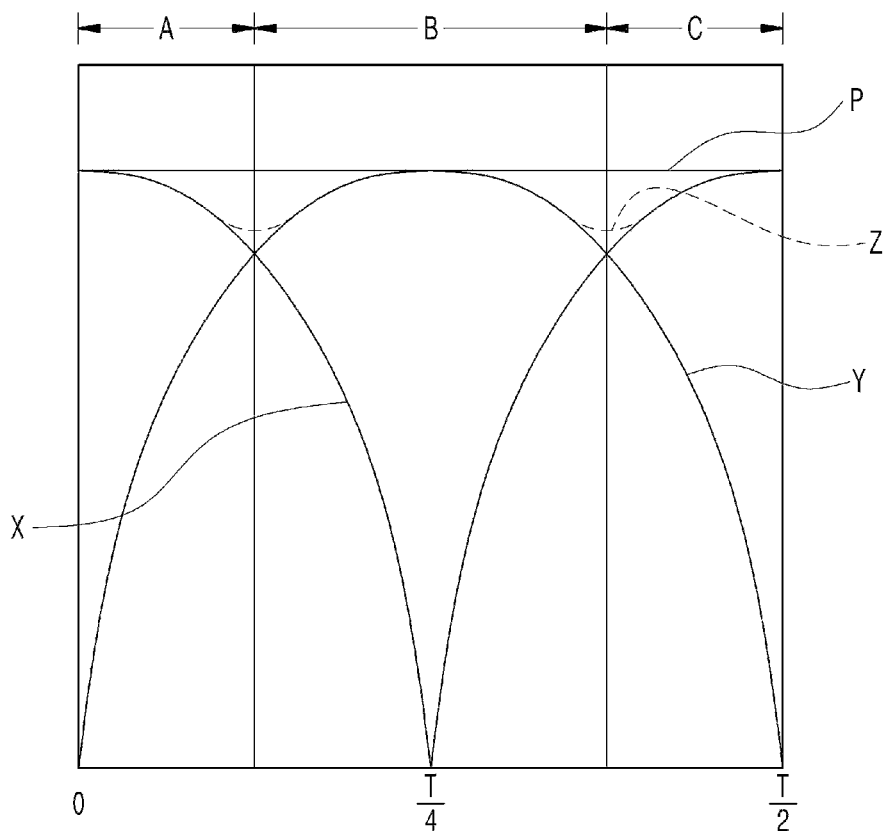
FIG. 8 is a diagram illustrating the rate of rotation of the multiple oscillation-type generator of FIG. 1.
Figure 9:
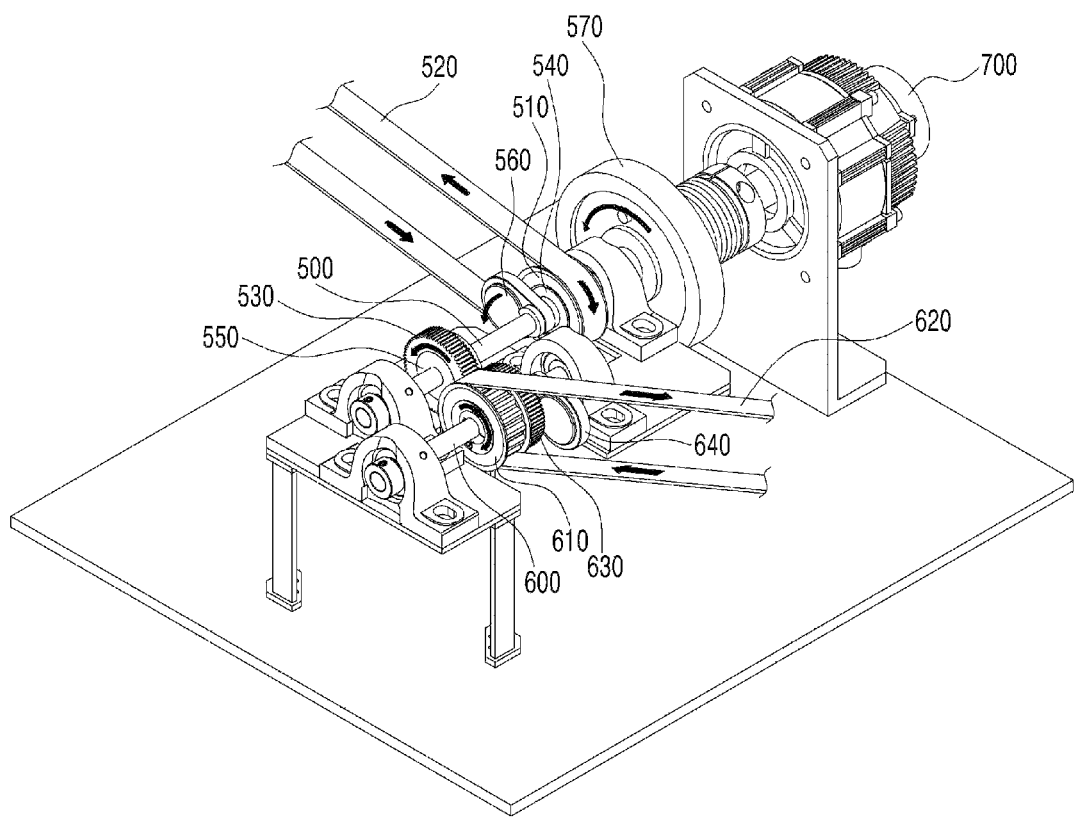
FIG. 9 is a perspective view illustrating the operating state of a main power shaft, an auxiliary power shaft, and a generation unit of the multiple oscillation-type generator of FIG. 1.

FIG. 1 is an overall perspective view of a multiple oscillation-type generator according to an embodiment of the present invention; FIG. 2 is a front view illustrating the installation state of the multiple oscillation-type generator of FIG. 1; FIG. 3 is a perspective view illustrating a first reciprocating member and a first conversion unit of the multiple oscillation-type generator of FIG. 1; FIGS. 4 and 5 are front views illustrating the operating state of the first reciprocating member and the first conversion unit of FIG. 3; FIGS. 6 and 7 are perspective views illustrating the operating state of the first conversion unit of FIG. 3; FIG. 8 is a diagram illustrating the rate of rotation of the multiple oscillation-type generator of FIG. 1; and FIG. 9 is a perspective view illustrating the operating state of a main power shaft, an auxiliary power shaft, and a generation unit of the multiple oscillation-type generator of FIG. 1.

The multiple oscillation-type generator according to the present invention is configured to produce electric power by repeatedly ascending and descending inside a flowing fluid by means of flow energy of the fluid. In this regard, the flowing fluid is preferably understood in a broad sense including liquid and gas, but it will be assumed in the following description of an embodiment of the present invention that the flowing fluid is used for tidal stream generation, which generates electric power using the flow of seawater.

As illustrated in FIG. 1 and FIG. 2, a multiple oscillation-type generator 1 according to an embodiment of the present invention includes a first reciprocating member 100, a second reciprocating member 200, a first conversion unit 300, a second conversion unit 400, a main power shaft 500, an auxiliary power shaft 600, and a generation unit 700.

The first reciprocating member 100 and the second reciprocating member 200 are arranged inside a fluid, configured to reciprocate by means of lifting or lowering force or flow energy from the fluid, and spaced from each other in the direction of flow of the tidal stream. The flow of tidal stream may have different velocities and directions depending on the horizontal and vertical coordinates inside seawater; as a result of spacing of the first reciprocating member 100 and the second reciprocating member 200 in the direction of flow of the tidal stream, the front reciprocating member blocks a part of the flow directed to the rear reciprocating member; but the eddy current generated by the front member increases the kinetic energy; as a result, the magnitude and velocity of kinetic energy transferred to the main power shaft 500 from each member do not differ significantly.

As illustrated in FIG. 3, the first reciprocating member 100 and the second reciprocating member 200 approximately have the shape of wings, which are streamlined when viewed from the side. The front ends of the first reciprocating member 100 and the second reciprocating member 200 are thicker than the rear ends thereof. In terms of the flow of tidal stream, the front ends are arranged upstream from the rear ends. In other words, the first reciprocating member 100 and the second reciprocating member 200 are arranged so that the tidal stream flows from the front ends towards the rear ends.

As illustrated in FIG. 4 and FIG. 5, when the generator 1 is activated, the inclination angle α of the first reciprocating member 100 is adjusted so that the first reciprocating member 100 reciprocates up and down. More specifically, when the inclination angle of the first reciprocating member 100 is adjusted so that its front end is higher than its rear end, the first reciprocating member 100 ascends; on the other hand, when the inclination angle of the first reciprocating member 100 is adjusted so that its rear end is higher than its front end, the first reciprocating member 100 descends.

Although not illustrated, the inclination angle of the second reciprocating member 200 is adjusted in the same manner. Detailed descriptions of devices for adjusting the inclination angles of the first reciprocating member 100 and the second reciprocating member 200 will be omitted herein.

As illustrated in FIG. 3, the first conversion unit 300 is connected to the first reciprocating member 100 and configured to convert the reciprocating movement of the first reciprocating member 100 into a rotational movement, and includes a first conversion module 310 and a second conversion module 320.

The first conversion module 310 is configured to convert the reciprocating movement of the first reciprocating member 100 into a bidirectional rotational movement and transfer it to the second conversion module 320, and includes a swing member 311, a first rotation member 312, a second rotation member 313, and a rotation force transfer member 314.

The swing member 311 has the shape of a long rod. One end of the swing member 311 is link-coupled to the first reciprocating member 100, and the other end of the swing member 311 is fixedly coupled to a support shaft which supports the first rotation member 312. Therefore, the swing member 311 makes repeated upward/downward swing movements which are interlocked with the reciprocating movements of the first reciprocating member 100.

The first rotation member 312 is fixedly coupled to the support shaft and rotated together when the support shaft rotates. The first rotation member 312 is configured as a pulley. The first rotation member 312 makes repeated bidirectional rotations which are interlocked with the repeated swing movements of the swing member 311. The pulley-belt structure can be replaced with a link structure or a chain-sprocket.

The second rotation member 313 is spaced from the first rotation member 312. More specifically, the second rotation member 313 is arranged at a predetermined distance from the first rotation member 312 in the upward direction. Therefore, the second rotation member 313 is arranged above the water surface (or, even when arranged underwater, inside air within the engine room), unlike the first rotation member 312. The second rotation member 313 is configured as a pulley as in the case of the first rotation member 312.

The rotation force transfer member 314 is configured to transfer the bidirectional rotations of the first rotation member 312 to the second rotation member 313 and is arranged to surround the first rotation member 312 and the second rotation member 313. The rotation force transfer member 314 is configured as a belt which transfers rotation force by means of tension.

Operations of the first conversion module 310, which result from reciprocating movements of the first reciprocating member 100, will now be described.

Referring to FIG. 4, when the inclination angle of the first reciprocating member 100 is adjusted so that the front end of the first reciprocating member 100 is higher than its rear end, the first reciprocating member 100 receives lifting force from the tidal stream. Therefore, the first reciprocating member 100 ascends, and the swing member 311, which is link-coupled to the first reciprocating member 100, swings upwards accordingly. The support shaft, to which the swing member 311 is fixedly coupled, then rotates counterclockwise, and the first rotation member 312, which is fixedly coupled to the support shaft, rotates counterclockwise together. In addition, as rotation force of the first rotation member 312 is transferred to the second rotation member 313 by the rotation force transfer member 314, the second rotation member 313 also rotates counterclockwise. As such, when the first reciprocating member 100 ascends, the first conversion module 310 outputs a counterclockwise rotational movement through the second rotation member 313.

Referring to FIG. 5, when the inclination angle of the first reciprocating member 100 is adjusted so that the rear end of the first reciprocating member 100 is higher than its front end, the first reciprocating member 100 receives lowering force from the tidal stream. Therefore, the first reciprocating member 100 descends, and the swing member 311, which is link-coupled to the first reciprocating member 100, swings downwards accordingly. The support shaft, to which the swing member 311 is fixedly coupled, then rotates clockwise, and the first rotation member 312 rotates clockwise together. In addition, as rotation force of the first rotation member 312 is transferred to the second rotation member 313 by the rotation force transfer member 314, the second rotation member 313 also rotates clockwise. As such, when the first reciprocating member 100 descends, the first conversion module 310 outputs a clockwise rotational movement through the second rotation member 313.

That is, when the generator 1 is activated, the first reciprocating member 100 repeats reciprocating movements in the upward and downward directions, and the first conversion module 310 converts the reciprocating movements of the first reciprocating member 100 into bidirectional (clockwise and counterclockwise) rotational movements and outputs them.

The second conversion module 320 is configured to receive bidirectional rotational movements, which have been outputted by the first conversion module 310, convert the bidirectional rotational movements into unidirectional rotational movements, and output them.

As illustrated in FIG. 3, the second conversion module 320 includes a first bidirectional rotation gear 321 and a second bidirectional rotation gear 322, which are mounted on a first shaft; a first idler gear 323 and a second idler gear 324, which are mounted on a second shaft; a first output gear 325 and a second output gear 326, which are mounted on an output shaft S; a third one-way clutch 327 and a fourth one-way clutch 328, which are arranged between the output shaft S and the first output gear 325 and the second output gear 326, respectively; and an output pulley 329 mounted on one end of the output shaft S.

The first bidirectional rotation gear 321 and the second bidirectional rotation gear 322 are configured as spur gears having the same number of gear teeth and the same shape and are fixedly coupled to the first shaft. The second rotation member 313 of the first conversion module 310 is also fixedly coupled to the first shaft, so that, as the second rotation member 313 makes bidirectional rotational movements, the first bidirectional rotation gear 321 and the second bidirectional rotation gear 322 also make bidirectional rotational movements.

The first idler gear 323 and the second idler gear 324 are configured as spur gears having the same number of gear teeth and the same shape and are fixedly coupled to the second shaft. The first idler gear engages with the second bidirectional rotation gear so that, when the first bidirectional rotation gear 321 and the second bidirectional rotation gear 322 rotate, the first idler gear 323 and the second idler gear 324 rotate in the opposite direction.

The first output gear 325 and the second output gear 326 are configured as spur gears having the same number of gear teeth and the same shape. The first output gear 325 is mounted on the output shaft S via the third one-way clutch 327, and the second output gear 326 is mounted on the output shaft S via the fourth one-way clutch 328. The first output gear 325 directly engages with the first bidirectional rotation gear and rotates in the opposite direction with regard to the first bidirectional rotation gear. The second output gear 326 engages with the second idler gear and rotates in the same direction as the second bidirectional rotation gear.

The third one-way clutch 327 and the fourth one-way clutch 328 are arranged between the first output gear 325 and the second output gear 326 and the output shaft S, respectively, and are fixedly coupled to the output shaft S. The third one-way clutch 327 and the fourth one-way clutch 328 transfer rotations of the first output gear 325 and the second output gear 326 in the counterclockwise direction (hereinafter, referred to as a first direction) to the output shaft S, but do not transfer rotations in the clockwise direction (hereinafter, referred to as a second direction), which is opposite the first direction, to the output shaft S.

When rotating in the first direction, the first output gear 325 and the second output gear 326 drive the output shaft S in the same direction by means of the third one-way clutch 327 and the fourth one-way clutch 328 but, when rotating in the second direction, do not drive the output shaft S, so that the output shaft S outputs unidirectional rotational movements.

Operations of the second conversion module 320, described above, will now be described in more detail.

As illustrated in FIG. 6, when the first reciprocating member 100 ascends, the first conversion module 310 outputs a rotational movement in the first direction through the second rotation member 313. The second rotation member 313 of the first conversion module 310 is fixedly coupled to the first shaft, so that the first bidirectional rotation gear 321 and the second bidirectional rotation gear 322 also rotate in the first direction. The first idler gear 323 engages with the second bidirectional rotation gear, so that the first idler gear 323 and the second idler gear 324 rotate in the second direction. The first output gear 325, which engages with the first bidirectional rotation gear, rotates in the second direction, and the second output gear 326, which engages with the second idler gear, rotates in the first direction.

The third one-way clutch 327 and the fourth one-way clutch 328, which are coupled to the first output gear 325 and the second output gear 326, respectively, transfer rotational force in the first direction only, so that rotational force in the second direction from the first output gear 325 is not transferred to the output shaft S, but rotational force in the first direction from the second output gear 326 is solely transferred to the output shaft S. Therefore, the output shaft S is rotated in the first direction by the rotational force in the first direction, which is transferred from the second output gear 326.

Referring to FIG. 7, when the first reciprocating member 100 descends, the first conversion module 310 outputs a rotational movement in the second direction through the second rotation member 313. The second rotation member 313 of the first conversion module 310 is fixedly coupled to the first shaft, so that the first bidirectional rotation gear 321 and the second bidirectional rotation gear 322 also rotate in the second direction. In addition, the first idler gear 323 engages with the second bidirectional rotation gear 322, so that the first idler gear 323 and the second idler gear 324 rotate in the first direction. The first output gear 325, which engages with the first bidirectional rotation gear, rotates in the first direction, and the second output gear 326, which engages with the second idler gear 324, rotates in the second direction.

The third one-way clutch 327 and the fourth one-way clutch 328, which are coupled to the first output gear 325 and the second output gear 326, respectively, transfer rotational force in the first direction only, so that rotational force in the first direction from the first output gear 325 is transferred to the output shaft S, but rotational force in the second direction from the second output gear 326 is not transferred to the output shaft S. Therefore, the output shaft S is rotated in the first direction by the rotational force in the first direction, which is transferred from the first output gear 325.

As illustrated in FIG. 1 and FIG. 2, the second conversion unit 400 has the same structure and operating mechanism as those of the first conversion unit 300, and is arranged to face it with the main power shaft 500 in the middle. Detailed descriptions of the second conversion unit 400 overlap those of the first conversion unit 300, and thus will be omitted herein.

As illustrated in FIG. 6 and FIG. 7, the output pulley 329 is mounted on ends of the output shafts S of the first conversion unit 300 and the second conversion unit 400 to transfer the unidirectional rotational movements of the output shafts S to the main power shaft 500.

The rate of rotation of the output pulley 329 has a shape similar to that of a sinusoidal wave, as illustrated in FIG. 8.

In FIG. 8, X indicates the change of rate, per half cycle, of the rotational movement transferred from the first conversion unit 300 to the main power shaft 500, and Y indicates the change of rate, per half cycle, of the rotational movement transferred from the second conversion unit 400 to the main power shaft 500.

The reciprocating movements of the first reciprocating member 100 and the second reciprocating member 200 are converted into unidirectional rotational movements of the output pulley 329 via the first conversion unit 300 and the second conversion unit 400, and the first reciprocating member 100 and the second reciprocating member 200 switch their direction of movement at the top and bottom dead points, respectively, so that the rate of rotation of the output pulley 329 has two zero points, where the rate of rotation is zero, per one rotation (one cycle of ascending and descending of the first reciprocating member 100 and the second reciprocating member 200).

The first reciprocating member 100 and the second reciprocating member 200 are configured to ascend and descend while forming a phase difference of approximately ¼ cycle so that the output rates of the first conversion unit 300 and the second conversion unit 400 form a phase difference. When the first reciprocating member 100 and the second reciprocating member 200 are configured to ascend and descend while forming a phase difference of approximately ¼ cycle, the zero point of one of them has the same phase as that of the highest rate of the other.

As illustrated in FIG. 9, the main power shaft 500 is equipped with a first one-way clutch 540 and a second one-way clutch 550 so that the larger one of the rotational forces of the first conversion unit 300 and the second conversion unit 400, the magnitudes of rate of rotation of which alternate with each other, is transferred; as a result, rotational forces of the first conversion unit 300 and the second conversion unit 400 are transferred through the first one-way clutch 540 and the second one-way clutch 550.

The main power shaft 500 and the auxiliary power shaft 600 will be described together for better understanding.

The main power shaft 500 is configured to transfer rotational forces of the first conversion unit 300 and the second conversion unit 400 to the generation unit 700 and is equipped with a first pulley 510, a first one-way clutch 540, a first crank 560, a first gear 530, a second one-way clutch 550, and a fly wheel 570. One end of the main power shaft 500 is coupled to the rotation shaft of the generation unit 700.

The auxiliary power shaft 600 is installed between the output pulley 329 of the second conversion unit 400 and the main power shaft 500 in parallel with the main power shaft 500 so that the rotational force, which is transferred by the second conversion unit 400, changes its direction and is transferred to the main power shaft 500, and is equipped with a second pulley 610, a second gear 630, and a second crank 640.

The rotational force from the first conversion unit 300 is transferred to the main power shaft 500 via the first pulley 510 and the first one-way clutch 540.

The first pulley 510 is connected to the output pulley 329 of the first conversion unit 300 via the first belt 520 to transfer the rotational force in the first direction from the first conversion unit 300 to the main power shaft 500, and is connected to the main power shaft 500 via the first one-way clutch 540 so that the rotational movement of the main power shaft 500 is not transferred to the first conversion unit 300.

The first one-way clutch 540 transfers the rotational movement of the first pulley 510, only in the first direction, to the main power shaft 500.

On the other hand, rotational force from the second conversion unit 400 is transferred to the main power shaft 500 via the second pulley 610, the second gear 630, the first gear 530, and the second one-way clutch 550.

The second pulley 610 is fixedly installed on the auxiliary power shaft 600 and is connected to the output pulley 329 of the second conversion unit 400 via the second belt 620 to transfer the rotational force in the first direction from the second conversion unit 400 to the auxiliary power shaft 600.

The first conversion unit 300 and the second conversion unit 400, which have the same structure, are arranged to face each other with reference to the main power shaft 500, so that the first conversion unit 300 and the second conversion unit 400 rotate in the opposite directions.

The second gear 630 is fixedly installed on the auxiliary power shaft 600 to rotate together with the second pulley 610.

The first gear 530 is connected to the main power shaft 500 via the second one-way clutch 550 so that the rotational movement of the main power shaft 500 is not transferred to the second conversion unit 400, and engages with the second gear 630, which is mounted on the auxiliary power shaft 600, to rotate in a direction opposite to the rotational direction of the second gear 630.

The first gear 530 and the second gear 630 have the same number of gear teeth so that the rotational movement of the second conversion unit 400 is transferred to the main power shaft 500 with no change in its phase.

A process of transfer of rotational movements of the first conversion unit 300 and the second conversion unit 400 to the main power shaft 500 will now be described.

Referring to FIG. 8, the first reciprocating member 100 and the second reciprocating member 200 ascend and descend while forming a phase difference of approximately ¼ cycle, so that the rates of rotation of the first conversion unit 300 and the second conversion unit 400 are transferred to the main power shaft 500 in an approximately sinusoidal shape, in which the zero point of one of them has the same phase as that of the highest rate of the other.

In range A, the rate of rotation X of the first conversion unit 300 is higher than the rate of rotation Y of the second conversion unit 400, and the rotational movement of the first conversion unit 300 is transferred to the main power shaft 500.

In range A, the rate of rotation X of the first conversion unit 300 is higher than the rate of rotation Y of the second conversion unit 400 so that the rotational force, which is transferred from the first conversion unit 300 via the first pulley 510, is transferred to the main power shaft 500 via the first one-way clutch 540, and the rate of rotation of the second conversion unit 400 is lower than the rate of rotation of the first conversion unit 300 so that the rotational force, which is transferred from the second conversion unit 400 via the first gear 530, is not transferred to the main power shaft 500 via the second one-way clutch 550.

In range B, the rate of rotation Y of the second conversion unit 400 is higher than the rate of rotation X of the first conversion unit 300, and the rotational movement of the second conversion unit 400 is transferred to the main power shaft 500.

In range B, contrary to range A, the rate of rotation of the second conversion unit 400 is higher than the rate of rotation of the first conversion unit 300 so that the rotational force, which is transferred from the second conversion unit 400 via the first gear 530, is transferred to the main power shaft 500 via the second one-way clutch 550, and the rate of rotation of the first conversion unit 300 is lower than the rate of rotation of the second conversion unit 400 so that the rotational force, which is transferred from the first conversion unit 300 via the first pulley 510, is not transferred to the main power shaft 500 via the first one-way clutch 540.

In range C, the rate of rotation of the first conversion unit 300 is again higher than the rate of rotation of the second conversion unit 400, and the rotational movement of the first conversion unit 300 is transferred to the main power shaft 500, as in range A. Range C is continuous with range A.

In FIG. 8, Z indicates the rate of rotation of the main power shaft 500. Ranges in which rotational inertia of the main power shaft 500 makes it rotate at a higher rate than the first pulley 510 and the first gear 530 exist partially between the sinusoidal waves of the first conversion unit 300 and the second conversion unit 400, which have a phase difference.

As illustrated in FIG. 9, the fly wheel 570 is mounted on the main power shaft 500 to increase the rotational inertia of the main power shaft 500. The fly wheel 570 increases the moment of inertia during rotation of the main power shaft 500 and thereby reduces the degree of variation of the uneven rates of rotation, which are transferred to the main power shaft 500 by the first conversion unit 300 and the second conversion unit 400.

The first crank 560 is coupled to the main power shaft 500 and is configured to ascend in ranges (ranges A and C), which include peak points of the rate of rotation X transferred from the first conversion unit 300 to the main power shaft 500 in an approximately sinusoidal shape and descend in a range (range B) which includes the valley point.

As described above, the rotational force is transferred via the first conversion unit 300 to the main power shaft 500 in ranges A and C, but is not transferred to the main power shaft 500 in range B. The rotational force transferred to the main power shaft 500 via the first pulley 510 has an alternately transferred shape so that rotational force transferred to the main power shaft 500 via the first pulley 510 rapidly drops in range B.

If the first crank 560 is coupled to the main power shaft 500 so that it rotates downwards in range B, which includes the valley point, the cyclic deviation of the rotational force of the main power shaft 500 is reduced, thereby guaranteeing transfer of more uniform rotational force to the generation unit 700.

The first crank 560 has an eccentric part coupled to the main power shaft 500 and configured to allow adjustment of the angle of arrangement when the multiple oscillation-type generator 1 is installed or activated, so that it rotates downwards in range B and rotates upwards in range C-A.

The second crank 640 is coupled to the auxiliary power shaft 600 and is configured to ascend in a range (range B), which includes the peak point of the rate of rotation Y transferred from the second conversion unit 400 to the auxiliary power shaft 600 in an approximately sinusoidal shape and descend in ranges (ranges A and C) which include the valley points.

If the second crank 640 is coupled to the main power shaft 500 so that it rotates downwards in range C-A, which includes the valley points, the cyclic deviation of the rotational force of the main power shaft 500 is reduced, thereby guaranteeing transfer of more uniform rotational force to the generation unit 700.

The second crank 640 has an eccentric part coupled to the auxiliary power shaft 600 and configured to allow adjustment of the angle of arrangement when the multiple oscillation-type generator 1 is installed or activated, so that it rotates downwards in range C-A and rotates upwards in range B.

In FIG. 8, P indicates the rate of rotation of the main power shaft 500 after the main power shaft 500 is equipped with the fly wheel 570 and the first crank 560 and the auxiliary power shaft 600 is equipped with the second crank 640. The main power shaft 500 can rotate at a constant rate by means of the first crank 560, the second crank 640, and the fly wheel 570 and thereby transfer a stable rotational movement to the rotation shaft of the generation unit 700.

The role of the first crank 560 is valid when the cycles of the first reciprocating member 100 and the first conversion unit 300 (in the case of the second crank 640, cycles of the second reciprocating member 200 and the second conversion unit 400) coincide, requiring adjustment of the number of teeth or the amplitude of up/down movements of a transfer gear or a transfer pulley for the purpose of cycle coincidence.

The multiple oscillation-type generator 1 according to an embodiment of the present invention has a first reciprocating member 100 and a first conversion unit 300 installed on one side, with reference to the main power shaft 500, and a second reciprocating member 200 and a second conversion unit 400 coupled to the other side, but it is also possible to additionally install a third reciprocating member and a third conversion unit (on the side of the first conversion unit 300) and a fourth reciprocating member and a fourth conversion unit (on the side of the second conversion unit 400) on both sides of the main power shaft 500, respectively.

Although not illustrated, rotational force may be directly transferred from the third conversion unit to the main power shaft 500 via a third belt (not illustrated) without any additional auxiliary power shaft. The main power shaft 500 is equipped with a third pulley (not illustrated), to which the third belt is coupled, together with a third one-way clutch (not illustrated).

Rotational force may be transferred from the fourth conversion unit to the main power shaft 500 via a fourth belt (not illustrated) and an additional auxiliary power shaft. It is also possible to directly transfer rotational force from the fourth conversion unit to the auxiliary power shaft 600 via the fourth belt (not illustrated). In this case, the auxiliary power shaft 600 is equipped with a fourth pulley (not illustrated) to which the fourth belt is coupled.

The present invention can provide a multiple oscillation-type generator 1 having swing members 311, which rotate together with the first reciprocating member 100 and the second reciprocating member 200 and transfer kinetic energy of the first reciprocating member 100 and the second reciprocating member 200 to the first conversion modules 310 and the second conversion modules 320, and the length of which is reduced within the entire kinetic energy transfer range, thereby minimizing energy loss caused by friction with fluid flow and resulting vibration.

The present invention can also provide a multiple oscillation-type generator 1 which can adjust the phase difference between the first reciprocating member 100 and the second reciprocating member 200 and which enables installation of an additional reciprocating member, if necessary, so that kinetic energy can be transferred continuously without forming any non-transfer point.

The present invention can also provide a multiple oscillation-type generator 1 configured to transfer kinetic energy of the first reciprocating member 100 and the second reciprocating member 200 to the generation unit 700 by means of a mechanical transfer configuration, thereby preventing energy loss caused by frictional heat resulting from use of a hydraulic device.

Although the exemplary embodiment of the present invention is described and shown, it is obvious to a person skilled in the art that the present invention is not limited to the described embodiment and may be changed and modified in various forms without departing from the spirit and scope of the present invention. Accordingly, modifications or variations should not be individually understood in view of the technical spirit of the present invention, and it must be understood the modifications and the variations belong to the claims of the present invention.

What is claimed is:

1. A multiple oscillation-type generator for converting flow energy of a fluid into electric power, the multiple oscillation-type generator comprising:
   a first reciprocating member arranged inside a fluid and configured to make a first ascending movement or a first descending movement within the fluid by a flow of the fluid;
   a second reciprocating member arranged inside the fluid and configured to make a second ascending movement or a second descending movement by the flow of the fluid, the first and second reciprocating members being spaced apart from each other;
   a first conversion unit connected to the first reciprocating member and configured to convert the first ascending movement or the first descending movement into a first rotational movement;
   a second conversion unit connected to the second reciprocating member and configured to convert the second ascending movement or the second descending movement into a second rotational movement;
   a main power shaft rotatably connected to the first conversion unit and the second conversion unit and configured to rotate by the first rotational movement or the second rotational movement; and
   a generation unit connected to the main power shaft and configured to produce electric power using the first rotational movement or the second rotational movement,
   wherein the first conversion unit comprises: a first conversion module configured to convert the first ascending movement and the first descending movement of the first reciprocating member into first bidirectional rotational movements,
   wherein the first conversion module comprises: a swing member having one end coupled to the first reciprocating member; and a first rotation member coupled to the other end of the swing member and configured to make the first bidirectional rotational movements by the first ascending movement and the first descending movement of the first reciprocating member;
   wherein the swing member and the first rotation member are arranged inside the fluid; and
   wherein the first reciprocating member has a wing shape having a streamline cross-section and an inclination angle, and the inclination angle is configured to be adjusted to cause the first ascending movement or the first descending movement.

2. The multiple oscillation-type generator of claim 1, further comprising:
   a first one-way clutch configured to connect the first conversion unit and the main power shaft; and
   a second one-way clutch configured to connect the second conversion unit and the main power shaft.

3. The multiple oscillation-type generator of claim 2, wherein the first one-way clutch and the second one-way clutch are formed on the main power shaft.

4. The multiple oscillation-type generator of claim 2, further comprising:
   a first gear coupled to the second one-way clutch;
   a second gear configured to rotate while being interlocked with the first gear; and
   an auxiliary power shaft configured to rotate together with the second conversion unit and the second gear.

5. The multiple oscillation-type generator of claim 2, further comprising:
   a first pulley coupled to the first one-way clutch; and
   a first belt configured to make a connection so that the first conversion unit and the first pulley are interlocked and rotated.

6. The multiple oscillation-type generator of claim 2, further comprising:
   a second pulley coupled to the second one-way clutch; and
   a second belt configured to make a connection so that the second conversion unit and the second pulley are interlocked and rotated.

7. The multiple oscillation-type generator of claim 4, further comprising:
   a first crank coupled to the main power shaft and rotated together, the first crank having an eccentric center of gravity with respect to the main power shaft; and
   a second crank coupled to the auxiliary power shaft and rotated together, the second crank having an eccentric center of gravity with respect to the auxiliary power shaft.

8. The multiple oscillation-type generator of claim 1, wherein a fly wheel is coupled to the main power shaft.

9. The multiple oscillation-type generator of claim 1, wherein the first conversion unit further comprises:
   a second conversion module configured to convert the first bidirectional rotational movements into first unidirectional rotational movements.

10. The multiple oscillation-type generator of claim 9, wherein the second conversion module comprises:
    a first bidirectional rotation gear and a second bidirectional rotation gear configured to rotate in both directions by the first conversion module;
    a first idler gear configured to engage with the first bidirectional rotation gear and rotate together;
    a second idler gear configured to rotate together with the first idler gear;
    a first output gear coupled to an output shaft and configured to engage with the second bidirectional rotation gear and rotate together;
    a second output gear coupled to the output shaft and configured to engage with the second idler gear and rotate together;
    a third one-way clutch configured to connect the first output gear and the output shaft; and
    a fourth one-way clutch configured to connect the second output gear and the output shaft.

11. The multiple oscillation-type generator of claim 10, wherein the first conversion module further comprises:
    a second rotation member arranged at a distance from the first rotation member and connected to the first bidirectional rotation gear and the second bidirectional rotation gear; and
    a rotation force transfer member configured to connect the first rotation member and the second rotation member.

* * * * *